(12) United States Patent
Schweizer

(10) Patent No.: US 11,518,628 B2
(45) Date of Patent: Dec. 6, 2022

(54) CONTAINER TERMINAL

(71) Applicant: Thomas Schweizer, Pratteln (CH)

(72) Inventor: Thomas Schweizer, Pratteln (CH)

( * ) Notice: Subject to any disclaimer, the term of this patent is extended or adjusted under 35 U.S.C. 154(b) by 9 days.

(21) Appl. No.: 17/263,922

(22) PCT Filed: Jul. 24, 2019

(86) PCT No.: PCT/CH2019/050015
§ 371 (c)(1),
(2) Date: Jan. 28, 2021

(87) PCT Pub. No.: WO2020/024069
PCT Pub. Date: Feb. 6, 2020

(65) Prior Publication Data
US 2021/0316953 A1    Oct. 14, 2021

(30) Foreign Application Priority Data

Aug. 3, 2018   (CH) .................................. 00952/2018

(51) Int. Cl.
*B65G 63/00* (2006.01)
*B65G 67/60* (2006.01)

(52) U.S. Cl.
CPC ......... *B65G 63/004* (2013.01); *B65G 67/603* (2013.01)

(58) Field of Classification Search
CPC ........................... B65G 63/004; B65G 67/603
See application file for complete search history.

(56) References Cited

U.S. PATENT DOCUMENTS

| 839,921 A | * | 1/1907 | Crocker | B65G 67/606 |
| | | | | 193/3 |
| 7,972,102 B2 | * | 7/2011 | Ward | B66C 19/007 |
| | | | | 414/137.1 |

FOREIGN PATENT DOCUMENTS

| DE | 2114705 | * | 3/1971 | ............. B65G 1/06 |
| JP | 9-156769 | * | 6/1997 | ............. B65G 63/00 |
| JP | 2016-64876 | * | 4/2016 | ............. B65G 63/00 |

* cited by examiner

*Primary Examiner* — Lynn E Schwenning
(74) *Attorney, Agent, or Firm* — Donald J. Ersler

(57) ABSTRACT

Container terminal comprising at least one ship crane (9) for loading and unloading a container ship (21), at least one handling crane (11) for loading and unloading a land vehicle such as a truck or a railway wagon with a container loop (1) being a circuit for automated guided vehicles (13) arranged on at least two levels of different elevation, so that in the area of the ship crane (9) a roadway 15 can be arranged underneath and parallel to the container loop (1) and there are no crossings between the entrance and exit of the roadway (15) and the container loop (1).

8 Claims, 5 Drawing Sheets

CONTAINER TERMINAL

The present invention relates to a container terminal according to the preamble of claim 1.

Known container terminals work with different types of AGVs (Automated Guided Vehicles), which cover long distances on a surface in order to transport containers between ships and land vehicles. This uses much energy (diesel fuel or electrical energy) to transport the containers. Since all other transports operate on the same surface as these AGVs, there are many points of contact where transport routes are used by different traffic types simultaneously or cross each other.

Conventional container terminals are therefore energy-intensive, dangerous and hardly walkable. There are many transport devices on one surface, great danger of collision with maintenance and operating vehicles as well as with personnel and, as a result, constant honking or ringing of the various devices (warning functions).

Patent EP 2641856 A2 discloses AGVs for use in a container terminal. It shows in detail the use and current possibilities of AGVs. To enable them to operate in other areas, a driver's cab is added and manual control is also provided. Furthermore, the automatic vehicles have to be supplied with energy at great expense.

Patent US 2006/0182527 A1 describes a method for automating a container terminal with automatic vehicles and for controlling the logistics chain within the terminal. With this solution, too, there is no disentanglement of the transport routes. In addition, the automatic vehicles must here also be supplied with energy at great expense.

The object of the present invention is to improve a container terminal of the type mentioned hereinabove in such a way that the advantages of the known container terminals are retained, the terminal disentangles the transport routes of the various transports, energy consumption is reduced, noise and light emissions are reduced, the handling and storage activities are optimised and the space required by the terminal is reduced.

This object is achieved by a container terminal with the features of claim 1. Further features and examples of embodiments are apparent from the dependent claims and their advantages are explained in the following description.

DRAWINGS

Figure 1:
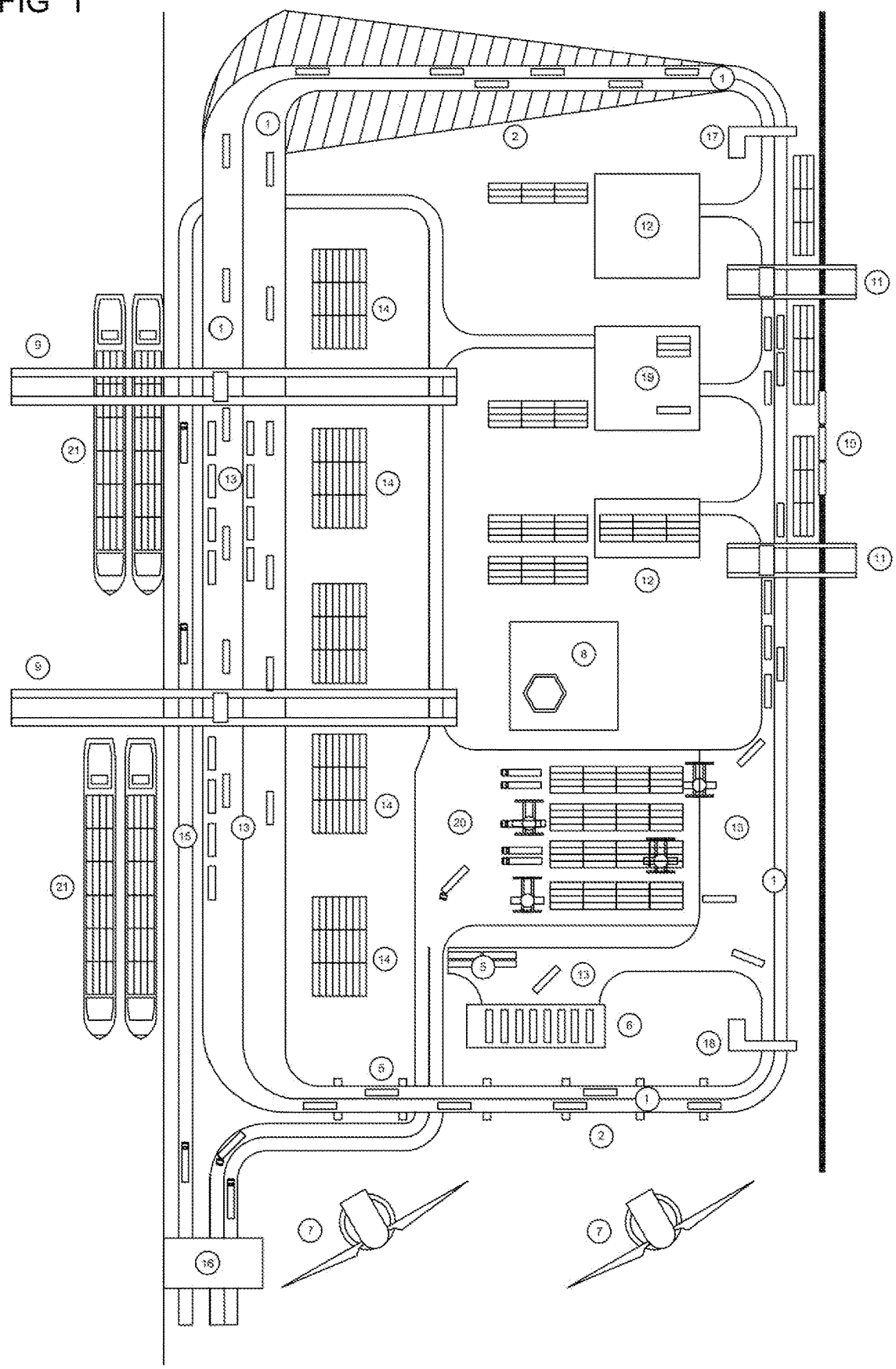
Figure 2:
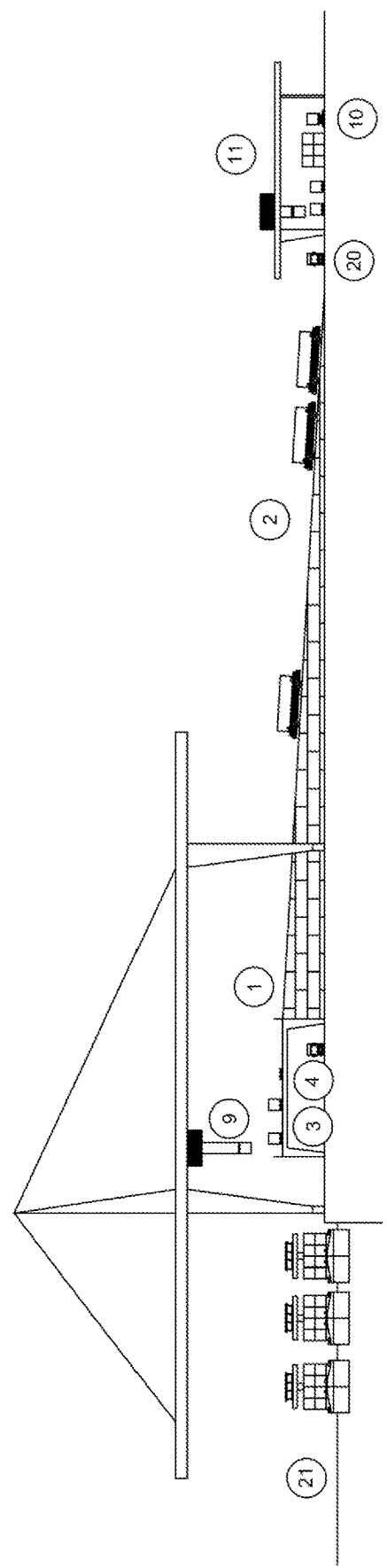
Figure 3:
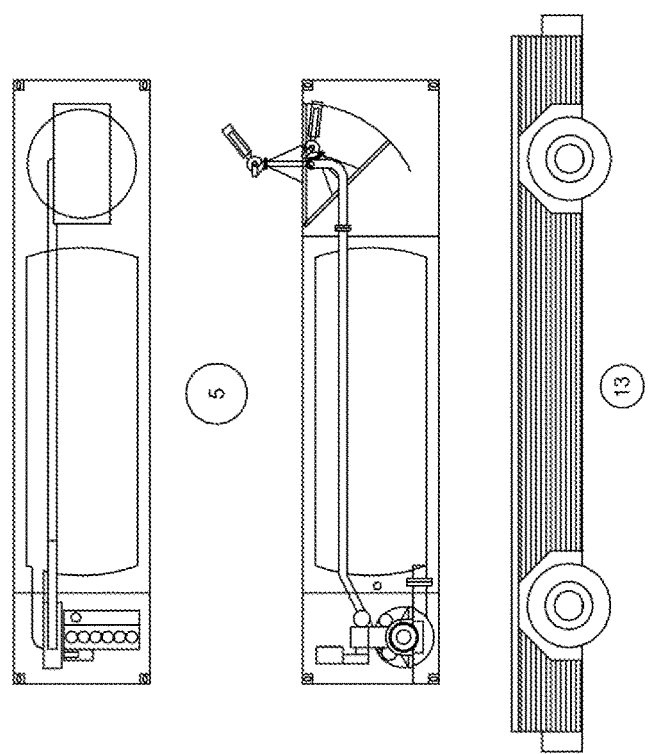
Figure 3:
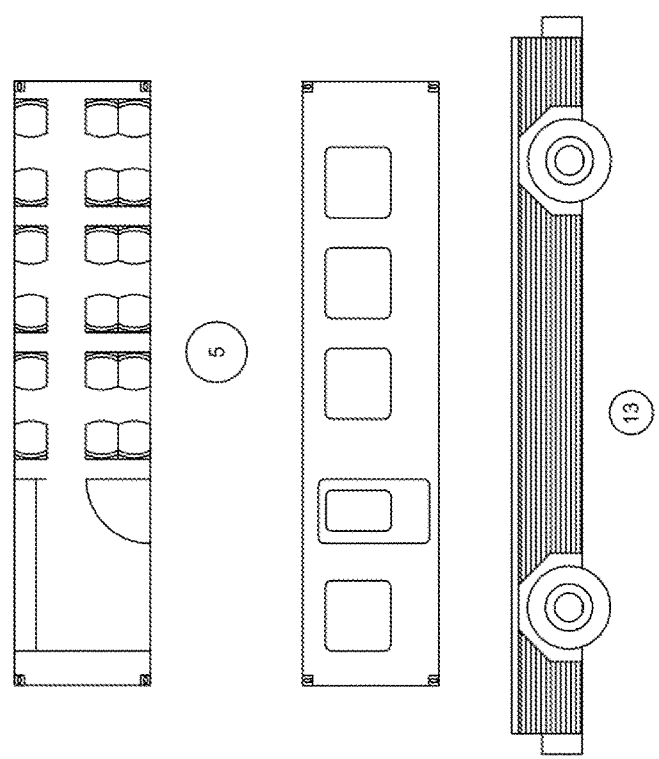
Figure 4:
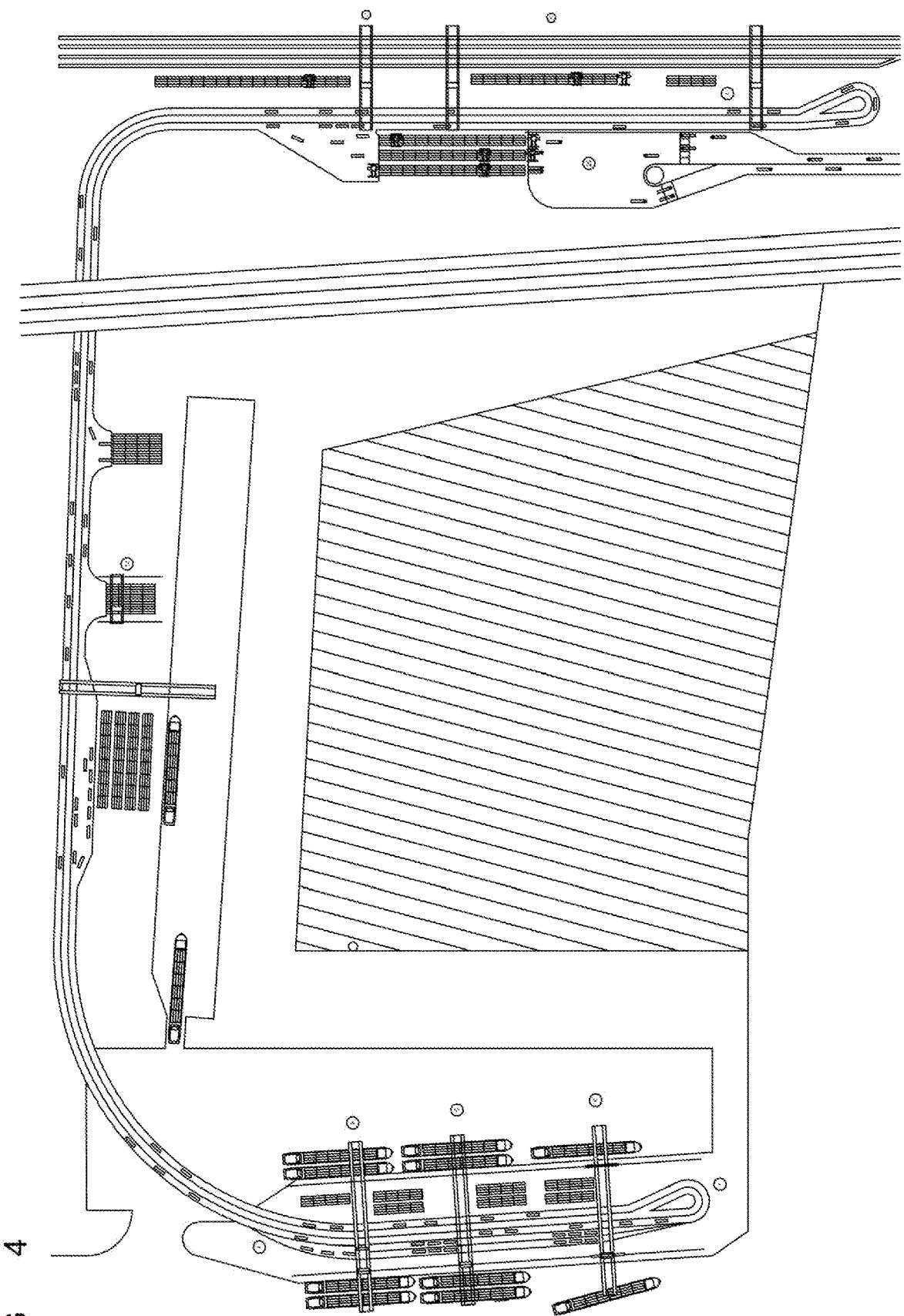
Figure 5:
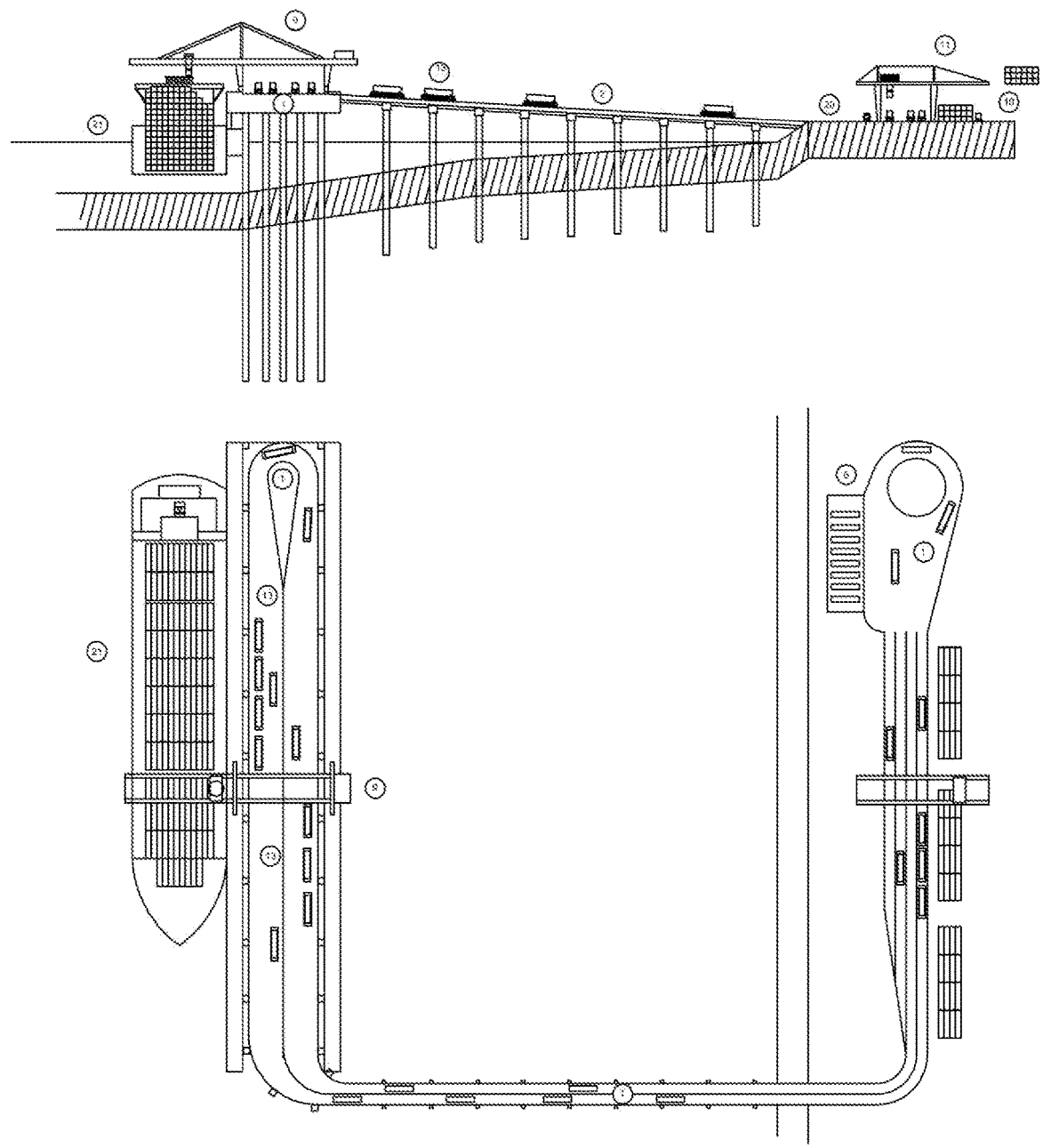

FIG. 1 Top view of a possible basic embodiment of the container loop and of the various transportation means connected to it FIG. 2 Schematic cross-section of the entire system from the ship to the rail terminal with the circuit ring as an inclined plane, as well as a detailed drawing of the loading level FIG. 3 Schematic representation of the additional modules for fire fighting and passenger transportation FIG. 4 View of an example of a container loop according to the invention in an urban area, using Basel Switzerland as an example FIG. 5 Top view and cross-section for the application in a coastal area with insufficient water depth for the mooring ships The figures show possible embodiments which are explained in the following description.

DESCRIPTION

A container loop 1 is provided in the container terminal on which only AGVs move (FIG. 1). This container loop 1 is a circular circuit on which the AGVs all move in the same direction, whereby the container loop can be multi-lane in individual areas or over the entire route. This container loop enables the AGVs to pick up the containers from the ship crane 9 and deliver them to the handling crane, or vice versa, without affecting other users. According to the invention, the container loop 1 is arranged on at least two levels of different elevation. This makes it possible to arrange an additional roadway 15 on another level in the area of the ship crane 9 (FIG. 2). This roadway 15 is parallel to the container loop 1 in this area and thus enables persons and vehicles to reach the ship without regard to the operation of the AGVs. As an additional advantage, the entrance and exit of the roadway 15 are also not arranged at the level of container loop 1, so that there are no crossings between roadway 15 and container loop 1. The traffic routes are therefore completely disentangled.

The loading level 3 is the area below the container loop 1 by the ship crane 9 and is reached via the roadway 15. This loading level 3 is therefore outside the safety area in which the AGVs are used, so that persons and vehicles can reach key points there safely and directly, independently of the handling operations. Ideally, the container loop 1 is not a full plane, but is partially formed as a bridge, so that the ship crane 9 can also pick up loads or containers directly from the loading level 3 or unload them there. The advantage of this arrangement is that all important areas under the container cranes can be reached under the protection of the bridges. Ship's personnel and operators (4) can thus reach the desired locations safely, unhindered by cargo handling operations. The loud honking or ringing of the AGVs is eliminated altogether, so that noise emissions from the container terminal are considerably reduced. Thanks to this arrangement, even a container falling out of the crane poses hardly any danger to the crews operating underneath.

Another advantage of this arrangement of loading level 3 below container loop 1 is that the AGVs are closer to the crane winch, so that the containers do not have to be lifted too far, which helps to reduce the swaying movements of the containers hanging at the crane during loading and unloading of the ship, so that the setting down of the containers on the AGVs can be completed more quickly, and work can also be carried out more efficiently and safely in the other way around.

Thanks to this disentanglement from the other vehicles and people, and since all AGVs travel in the same direction, the speed and density of the AGVs can be optimised so that the container handling frequency can be considerably increased compared to a conventional container terminal. Depending on the state of development of the AGVs, travel speeds of up to 50 km/h should be achievable. With several lanes, the AGVs can operate with optimal safety distances and speeds adapted to the current need. Likewise, the number of AGVs in operation on the container loop 1 is adjusted according to the need and can ideally be controlled by a central computer.

The AGVs can be equipped with sensors which determine the distance to ensure that a following AGV does not collide with the preceding AGV when it slows down. These distance sensors can work with infrared, for example, so that no daylight or even artificial lighting is needed. This has the considerable advantage that those areas in which only the AGVs travel can also do without lighting. This way, light emissions from the container terminal are reduced and completely avoided in at least certain areas of the container loop.

In a preferred embodiment, in the area of one or more handling cranes 11, a rail terminal 10 with a rail track is located on the same level as the container loop 1. This allows the AGVs on the container loop 1 to be brought directly beside the rail wagons (10). This way, the full length of a railway train can be loaded quickly without manoeuvering. All that is needed is one or more cranes 11 that can move longitudinally above the train to load the containers.

In order for the AGVs to reach the levels of different heights of the container loop 1, they are connected by an inclined plane 2. To achieve optimal energy savings, the height difference of the levels and the length of the transport distances between the levels can be adjusted. It is particularly advantageous when the height energy brought by the crane lift is converted into kinetic energy when travelling downwards on the inclined plane 2. The inclined plane 2 can be built as a dam or as a bridge. Since in an import port, most arriving containers are loaded, energy can even be gained via the inclined plane when travelling downwards from the level near the ship crane to the level near the handling crane, so that the battery of an electrically driven AGV can be charged. On the one hand, energy recovery systems can thus be used optimally, e.g. when a 40' container loaded with 40 tons is moved downwards and afterwards only a 4-ton empty 40' container has to be moved upwards again. This way, AGVs with smaller batteries can also be used and $CO_2$ reductions are also achieved.

According to a preferred embodiment, the container terminal is controlled via a central registration point 8. There, the arrival times of the ships and containers are recorded and coordinated with the various service providers. After recording, a suitable software solution is used to calculate the number of AGVs and their optimal speed in order to be able to serve the ship and the handling crane with containers at an optimal frequency.

Another advantageous design of the container terminal includes the possibility of non-discriminatory access to the container loop by several companies 12 located on the site. For this purpose, the container loop can be provided with several loops and with branches in certain areas of the terminal. Depending on demand, the containers are then delivered to these companies via these additional loops with the AGVs or collected there by the AGVs. It does not matter whether a company provides one container per day or several thousand. Each container to be transported is registered and picked up or delivered "just in time" by the AGV controlled from the registration point 8.

Preferably, the container loop is to be optimally adapted to the local conditions with road and railway access. A particular advantage of the container loop is that the containers delivered by road or rail can be driven by the AGVs to the loading crane and/or to an intermediate storage facility even before a ship has docked. From the intermediate storage 14, the containers can then be loaded quickly when the ship arrives. This way, idle times can be optimised and shortened for all transportation means.

In a further embodiment of the container terminal according to the invention, various container modules 5 are provided (FIG. 3), which can also be placed on the AGVs. These include 20 or 40' containers as fire-fighting modules, as passenger and/or material transport modules (5). These modules can be introduced into the traffic on the container loop at any time as required. Ideally, they are kept ready in one or more dedicated areas of the container loop 1.

If a container with hazardous goods is transported, it is also possible, in addition to an increased safety distance between the AGVs on the loop, to accompany the hazardous goods container for safety with a second AGV with a fire-fighting module.

In one possible embodiment, these container modules are stored at the central charging station 6, where the AGVs can also be charged. Depending on the size and arrangement of the container terminal, it could make sense to set up such charging stations at different locations of the container loop 1. In coastal areas with much wind, such a charging station could also be provided with one or more wind turbines 7 so that the electricity for charging the batteries of the AGVs is also produced with as little $CO_2$ emissions as possible.

At the same time, such a container loop can be used for scientific experiments and investigations with autonomous vehicles. This can be of great benefit and interest, especially in the context of energy efficiency and the optimisation of batteries and other components of electrically driven vehicles. This way, the utilisation rate of the container loop can also be significantly increased.

In another preferred embodiment, parking spaces for cars or so-called express roadways for urgent deliveries or collections of containers can also be provided underneath the loading level 3. These are usually transported by truck and registered at the entry gate at the registration point. There, it is decided whether normal or express handling is required. Express handling can be carried out for a special fee (environmental tax) in order to regulate truck traffic in the terminal. Nevertheless, independent and fast delivery directly to the ship crane (9) is possible at any time, irrespective of the traffic with AGVs on container loop 1.

According to another embodiment, the container loop can be equipped with a scanner at two or more points. For example, once for import 17 and once for export 18. Thus, one has access from the central registration point 8 at any time for a check of the contents. Suspicious containers can then be taken off the loop and checked at customs point 19.

The container terminal with container loop according to the invention can be adapted to a wide variety of port and terrain situations. Possible examples are shown in FIG. 4 and FIG. 5.

The invention claimed is:

1. Container terminal comprising:
   at least one ship crane (9) for loading and unloading a container ship (21), at least one handling crane (11) for loading and unloading a land vehicle, a container loop (1) being a circuit ring for automated guided vehicles (13), characterized in that the container loop (1) is arranged on at least two levels of different elevation, said at least two levels include a first upper level located near a ship crane (9) and a second lower near the handling crane (11), said first upper level and said second lower level are connected by an inclined plane (2), a roadway (15) is arranged below and parallel to the container loop (1), said roadway (15) passes under said first upper level, and there are no intersections between the entrance and exit of the roadway (15) and the container loop (1).

2. Container terminal according to claim 1, characterized in that a rail terminal (10) with a rail track and direct connection to the container loop (1) is located in the area of the handling crane (11).

3. Container terminal according to claim 1, characterized in that the container loop (1) is multi-lane and is provided with several loops and with branches.

4. Container terminal according to claim 1, characterized in that in one area of the container loop (1), the automated guided vehicles are loaded with container modules (5) for fire fighting, maintenance or passenger transport.

5. Container terminal according to claim 1, characterized in that loading stations (6) for the automated guided vehicles are provided at one or more locations of the container loop (1).

6. Use of a container loop (1) according to claim 1 being a circuit for automated guided vehicles (13) in a container terminal with a central registration point (8) for containers, characterized in that central control records all the containers registered for handling by the registration point and determines therefrom the optimum number and speed of the automated guided vehicles travelling on the container loop (1).

7. Use of the container loop (1) according to claim 6, characterized in that different companies or warehouses can be accessed by the automated guided vehicles on the container loop (1), so that each user has access to the transport services and the loading possibilities.

8. Use of the container loop (1) according to claim 6, characterized in that all permanent equipment of the container terminal including automated guided vehicles and cranes, are electrically operated and no combustion engines are used.

* * * * *